United States Patent
Shoji et al.

(10) Patent No.: US 7,511,839 B2
(45) Date of Patent: Mar. 31, 2009

(54) COMPOSITE APPARATUS AND FACSIMILE APPARATUS CONNECTABLE TO LAN, AND CONTROL METHOD FOR LAN CONNECTION

(75) Inventors: Fumio Shoji, Chiba (JP); Toru Fujino, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 10/259,284

(22) Filed: Sep. 30, 2002

(65) Prior Publication Data

US 2003/0063307 A1    Apr. 3, 2003

(30) Foreign Application Priority Data

Oct. 3, 2001    (JP)    ............................ 2001-307418

(51) Int. Cl.
*G06F 3/12*    (2006.01)
*G06F 13/12*    (2006.01)
*G06F 13/14*    (2006.01)
*G06F 3/00*    (2006.01)
*H04N 1/00*    (2006.01)
*H04N 1/32*    (2006.01)
*H04L 12/28*    (2006.01)
*H04L 12/56*    (2006.01)

(52) U.S. Cl. ..................... 358/1.15; 358/1.13; 358/425; 358/468; 370/912

(58) Field of Classification Search ..................... None
See application file for complete search history.

(56) References Cited

U.S. PATENT DOCUMENTS

| | | | | |
|---|---|---|---|---|
| 5,412,779 A | | 5/1995 | Motoyama | ................... 395/275 |
| 5,461,704 A | * | 10/1995 | Wakabayashi et al. | ..... 358/1.15 |
| 5,521,719 A | * | 5/1996 | Yamada | ....................... 358/438 |
| 5,552,901 A | | 9/1996 | Kikuchi et al. | ............... 358/468 |
| 5,673,117 A | * | 9/1997 | Ezumi et al. | ................. 358/400 |
| 5,684,607 A | * | 11/1997 | Matsumoto | ................... 358/442 |
| 5,872,901 A | * | 2/1999 | Konno et al. | ................ 358/1.15 |
| 6,020,971 A | * | 2/2000 | Kato et al. | .................. 358/1.14 |
| 6,195,171 B1 | * | 2/2001 | Ochiai | ......................... 358/1.15 |
| 6,246,487 B1 | * | 6/2001 | Kobayashi et al. | .......... 358/1.13 |
| 6,864,991 B1 | * | 3/2005 | Takahashi | ................... 358/1.15 |
| 6,906,813 B1 | * | 6/2005 | Tuchitoi et al. | ............. 358/1.14 |
| 6,934,044 B1 | * | 8/2005 | Khandelwal | ................ 358/1.15 |
| 6,943,910 B2 | * | 9/2005 | Tanimoto | .................... 358/1.15 |
| 2003/0038979 A1 | * | 2/2003 | Seki et al. | .................... 358/402 |
| 2006/0034264 A1 | * | 2/2006 | Dlugos et al. | ................ 370/352 |

FOREIGN PATENT DOCUMENTS

EP    0 798 904 A2    10/1997

(Continued)

*Primary Examiner*—Twyler L Haskins
*Assistant Examiner*—Myles D Robinson
(74) *Attorney, Agent, or Firm*—Fitzpatrick, Cella, Harper & Scinto

(57) ABSTRACT

A control method for a composite apparatus having at least a printer function, and further having a controller adapted to control an entire apparatus, a network connector adapted to connect to a network to send and receive a packet, and a printer language processor adapted to process a printer language. First, contents of the packet inputted via the network connector is analyzed, then if the analyzed packet is print data, the packet is transferred to the printer language processor, and if the analyzed packet is not the print data, the packet is transferred to the controller.

7 Claims, 15 Drawing Sheets

FOREIGN PATENT DOCUMENTS

| | | | |
|---|---|---|---|
| EP | 1 024 652 A2 | 8/2000 |
| EP | 1 041 778 A2 | 10/2000 |
| EP | 1 083 733 A2 | 3/2001 |
| EP | 1301022 A2 * | 4/2003 |
| JP | 02119350 A * | 5/1990 |
| JP | 08317165 A * | 11/1996 |
| JP | 11-205497 A | 7/1999 |
| JP | 2000-112684 | 5/2000 |
| JP | 2001-245083 | 9/2001 |
| JP | 2005169622 A * | 6/2005 |

* cited by examiner

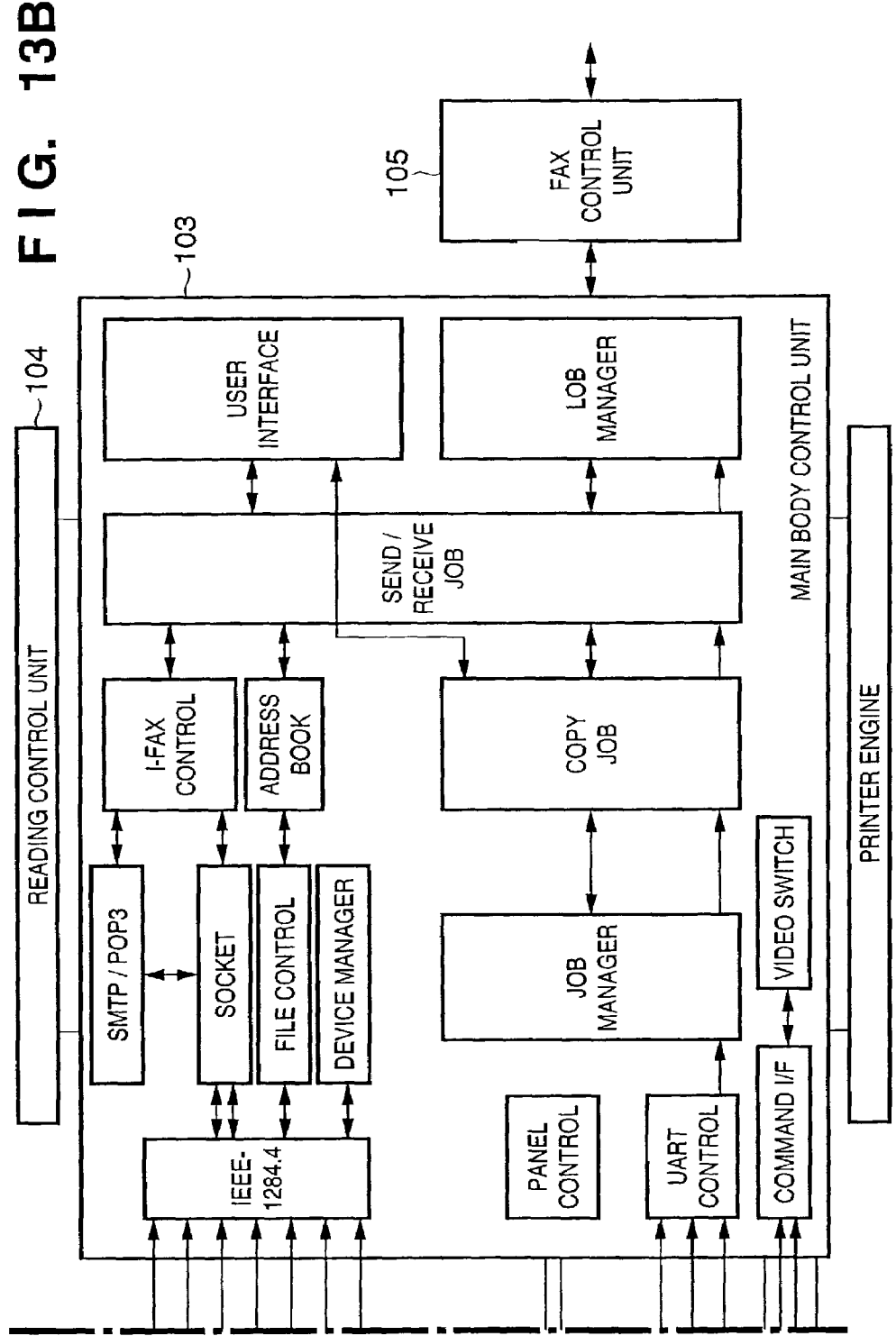

COMPOSITE APPARATUS AND FACSIMILE APPARATUS CONNECTABLE TO LAN, AND CONTROL METHOD FOR LAN CONNECTION

FIELD OF THE INVENTION

The present invention relates to a facsimile apparatus provided with a network interface connectable to a LAN, and a composite apparatus comprising the facsimile apparatus and a copying apparatus and/or a printing apparatus.

BACKGROUND OF THE INVENTION

A conventional facsimile apparatus had not been provided with the network interface for connecting to the LAN, since the apparatus has been mainly for communication utilizing a public line. However, as a standard for an Internet facsimile has been maintained, a facsimile apparatus provided with the network interface has appeared. Since such a facsimile apparatus has been provided with the network interface, it is expected to view, at a remote location, sending and receiving history information on the facsimile apparatus, registration of device information or the like, from a terminal device such as a PC via a network. In such case, it would be common that an independent HTTP server machine is installed on the LAN, and the device information and control information are communicated between the server machine and the facsimile apparatus, using a unique protocol on the network, so that a user accesses the HTTP server machine from a browser software on the PC to control remotely the facsimile apparatus.

On the other hand, more composite apparatuses integrally configured with a copying function, a facsimile function and a printer function have been used, which are connected to the LAN so that the information and condition of the apparatuses are controlled from other terminals or the like connected to the LAN. The device information as used herein includes, for example, a name of the apparatus, where the apparatus is installed, information on a device administrator, an operation history of facsimile communication or printing or the like. The condition as used herein includes the condition of the apparatus such as whether the apparatus is performing the facsimile communication or the printing, or in a no-paper condition or the like.

Conventionally, upon configuring such a network-type composite apparatus which is connected to the LAN and can be managed its starting of a job, the information and the condition of the apparatus via the LAN, though each of a copying apparatus, a copying and facsimile apparatus, and a printer exists as an independent product, the network-type composite apparatus has been realized by newly developing each of a scanner control, a modem control, a printer control and a PDL process or the like and making a process unit for each of them to be network-support type.

In addition, when the network-type composite apparatus is configured using the existing copying and facsimile apparatus and the existing printer, a portion of the copying and facsimile apparatus has performed a main control of the device and handling of all packets received from the network.

However, in the above described conventional example, since there are too many portions to be newly developed, there have been drawbacks not only that a development period becomes long, but also that a development cost increases. For example, a PDL process unit may be configured changeable in accordance with a type of a printer language, and if the PDL process unit is changed, it is necessary to develop the portion of the copying and facsimile apparatus to be able to perform a print operation with the changed PDL process unit.

Furthermore, even when the network-type composite apparatus is configured using the existing copying and facsimile apparatus and the existing printer, since the portion of the copying and facsimile apparatus performing the main control controls all the packets received from the network, when the portion of the copying and facsimile apparatus handles mass data such as print data or the like, there have been drawbacks not only that a system load becomes heavier, but also that a print speed decreases.

In addition, in the case of the facsimile apparatus provided with the network interface, in order to operate the facsimile apparatus remotely from the terminal device, there has been a need for a device which is adapted to communicate the device information with the facsimile apparatus and operates as the HTTP server, in addition to the terminal device of the user and the facsimile apparatus. In addition, though it is possible to eliminate a need of the HTTP server machine by implementing an HTTP server function within the facsimile apparatus, if the network interface is not used, there has been a problem that the portion of the HTTP server function implemented within the facsimile apparatus becomes useless, and a cost for the facsimile apparatus increases. Furthermore, since technique and the functions regarding the HTTP are improving, if the HTTP server function is implemented within the device, there would be a problem that it is necessary to exchange the entire device in order to replace the HTTP server function with a higher one, and the cost is required accordingly.

SUMMARY OF THE INVENTION

The present invention has been made in consideration of the above situation, and has as its first object to lower a development period and a development cost for a composite apparatus having a printer function, a copying function, a facsimile function or the like, distribute the load of the system, and improve a print speed.

In addition, the present invention has as its second object to enable a remote operation of the composite apparatus with the facsimile function and the copying function and/or the printer function, and of a facsimile apparatus, without installing an independent HTTP server machine.

Furthermore, the present invention has as its further object to provide inexpensively the composite apparatus and the facsimile apparatus to which functions required for the remote operation can be provided as necessary, and which have an HTTP server function whose performance can be improved.

According to the present invention, the foregoing first object is attained by providing a control method for a composite apparatus having at least a printer function, and further having a controller adapted to control an entire apparatus, a network connector adapted to connect to a network to send and receive a packet, and a printer language processor adapted to process a printer language, characterized by comprising: analyzing contents of the packet inputted via the network connector; transferring the packet to the printer language processor if the analyzed packet is print data; and transferring the packet to the controller if the analyzed packet is not the print data.

Further, the foregoing first object is also attained by providing a composite apparatus having at least a printer function, characterized by comprising: a controller adapted to control an entire apparatus; a printer language processor adapted to process a printer language; a network connector adapted to connect to a network to send and receive a packet;

a packet analyzer adapted to analyze contents of the packet inputted via the network connector; a first transfer unit adapted to, if the packet analyzed by the packet analyzer is print data, transfer the packet to the printer language processor; and a second transfer unit adapted to, if the packet analyzed by the packet analyzer is not the print data, transfer the packet to the controller.

Further, the foregoing first object is also attained by providing a network connection apparatus used in a composite apparatus having at least a printer function, and further having a controller adapted to control the entire apparatus and a printer language processor adapted to process a printer language, characterized by comprising: a network connector adapted to connect to a network to send and receive a packet, a first packet analyzer adapted to analyze contents of the packet inputted via the network connector; a first transfer unit adapted to, if the packet analyzed by the first packet analyzer is print data, transfer the packet to the printer language processor; and a second transfer unit adapted to, if the packet analyzed by the first packet analyzer is not the print data, transfer the packet to the controller.

According to the present invention, the foregoing second and third object are attained by providing a composite apparatus characterized by comprising: an image reader; a communication unit adapted to perform communication of image data via a public line; a network connector, having an HTTP server function, adapted to connect to a network; and a printer adapted to perform printing based on the image data inputted via the image reader, the communication unit and the network connector, wherein the network connector is detachable.

Further, the foregoing first object is also attained by providing a facsimile apparatus characterized by comprising: a facsimile unit; and a network connector, having an HTTP server function, adapted to connect to a network, wherein the network connector is detachable.

Further, the foregoing first object is also attained by providing a network connection device used in a composite apparatus having an image reader, a communication unit adapted to perform communication of image data via a public line, and a printer adapted to perform printing based on the image data, characterized by comprising: a network connector, having an HTTP server function, adapted to connect to a network, wherein the network connector is connected via an interface allowing multi-channel communication, the composite apparatus passes unique information to the network connector, and the HTTP server function configures a substance of contents to be displayed based on the unique information.

Further, the foregoing first object is also attained by providing a network connection device used in a facsimile apparatus characterized by comprising: a network connector, having an HTTP server function, adapted to connect to a network, wherein the network connector is connected via an interface allowing multi-channel communication, the composite apparatus passes unique information to the network connector, and the HTTP server function configures a substance of contents to be displayed based on the unique information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A and 13B are block diagrams showing in detail an example of an internal configuration of the facsimile apparatus according to the second embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
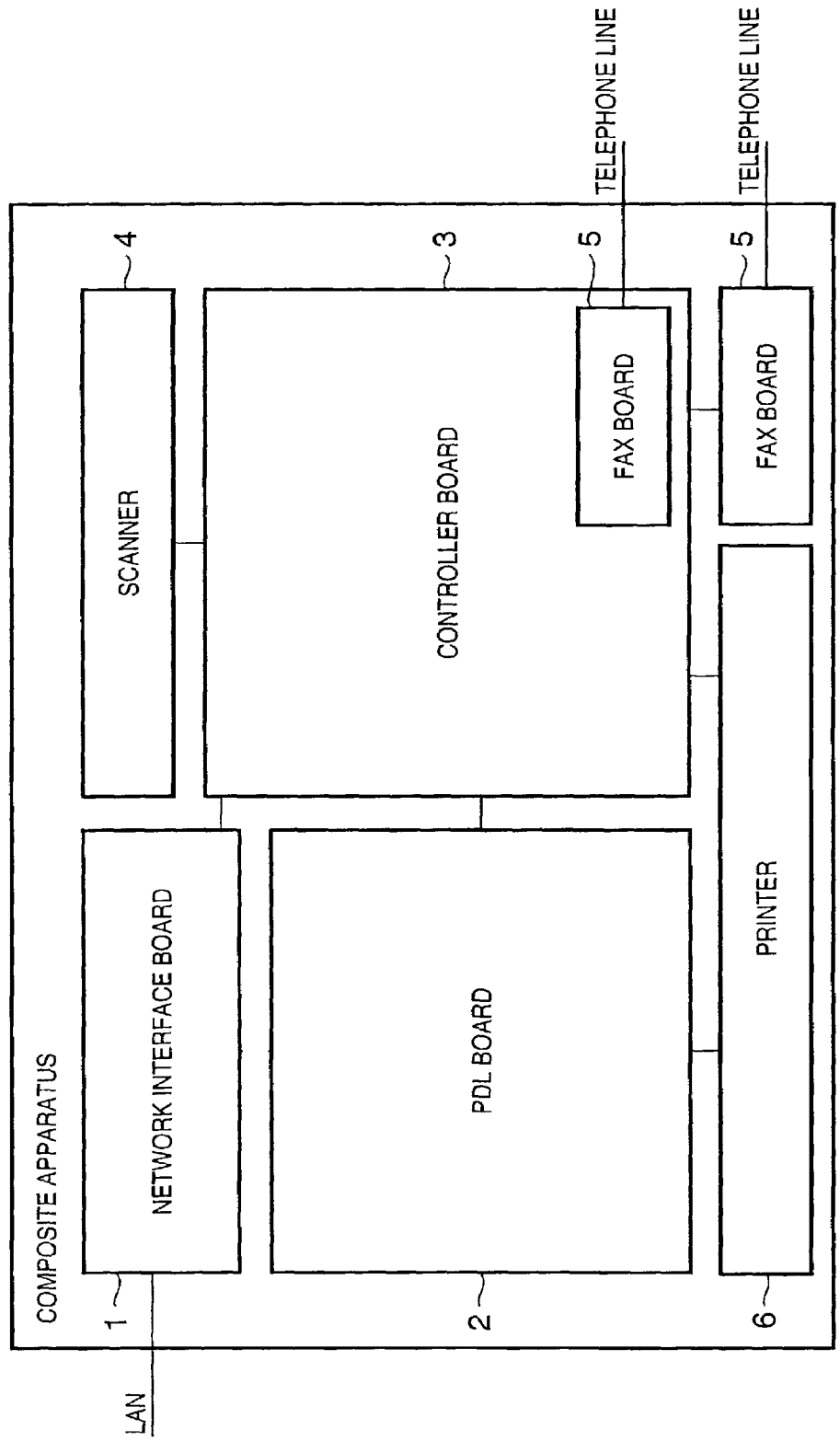
FIG. 1 is a block diagram schematically showing a hardware configuration of a composite apparatus according to a first embodiment of the present invention.

FIG. 1 is a block diagram schematically showing a hardware configuration of a composite apparatus integrally configured by a copying function, a facsimile function and a printer function of the present invention.

In FIG. 1, reference numeral 1 denotes a network interface board; 2, a PDL board; 3, a controller board adapted to control the entire composite apparatus; 4, a scanner adapted to read an original optically; 5, a facsimile board (hereinafter referred to as a FAX board) adapted to control a telephone line to control facsimile communication; and 6, a printer.

The network interface board 1 controls a LAN and an interface to send and receive a packet, and sends and receives the packet to/from the PDL board 2 and the controller board 3. The PDL board 2 analyzes a printer language from the packet received from the network interface board 1 and produces print data, then controls the printer 6 to print. If the printer function is not required in the composite apparatus, the PDL board 2 is not required so that the PDL board 2 is detachably configured.

In addition, the FAX board 5 may be included in the controller board 3, and optionally may be configured outside of the controller board 3, both of which are shown in FIG. 1. The printer 6 is a printer adapted to print the print data produced by the PDL board 2 and the print data produced by the controller board 3.

Figure 2:
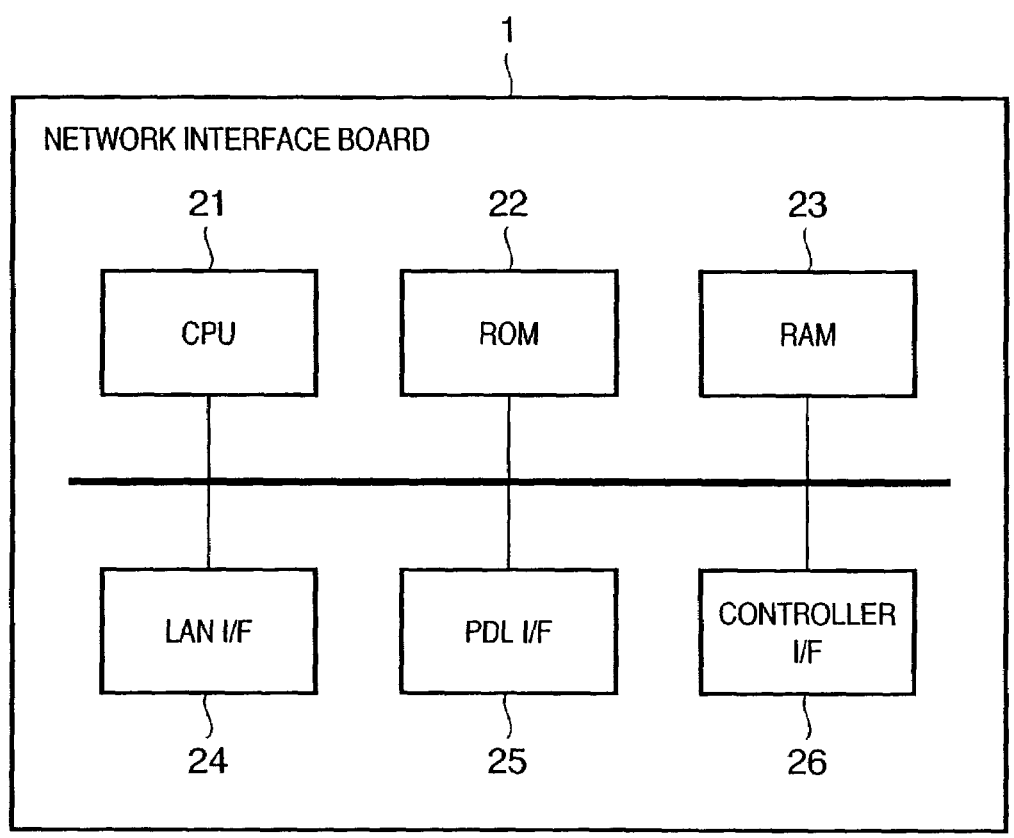
FIG. 2 is a block diagram schematically showing a hardware configuration of a network interface board shown in FIG. 1.

FIG. 2 is a schematic diagram of a hardware configuration of the network interface board 1 shown in FIG. 1.

In FIG. 2, reference numeral 21 denotes a CPU adapted to control the entire network interface board 1; 22, a ROM having stored every program for controlling the network interface board 1; 23, a RAM to be used as a work area when the program is executed, or as a data handling area; 24, a LAN I/F adapted to control a physical interface with the LAN; 25, a PDL I/F adapted to control a physical interface with the PDL board 2; and 26, a controller I/F adapted to control a physical interface with the controller board 3.

Figure 3:
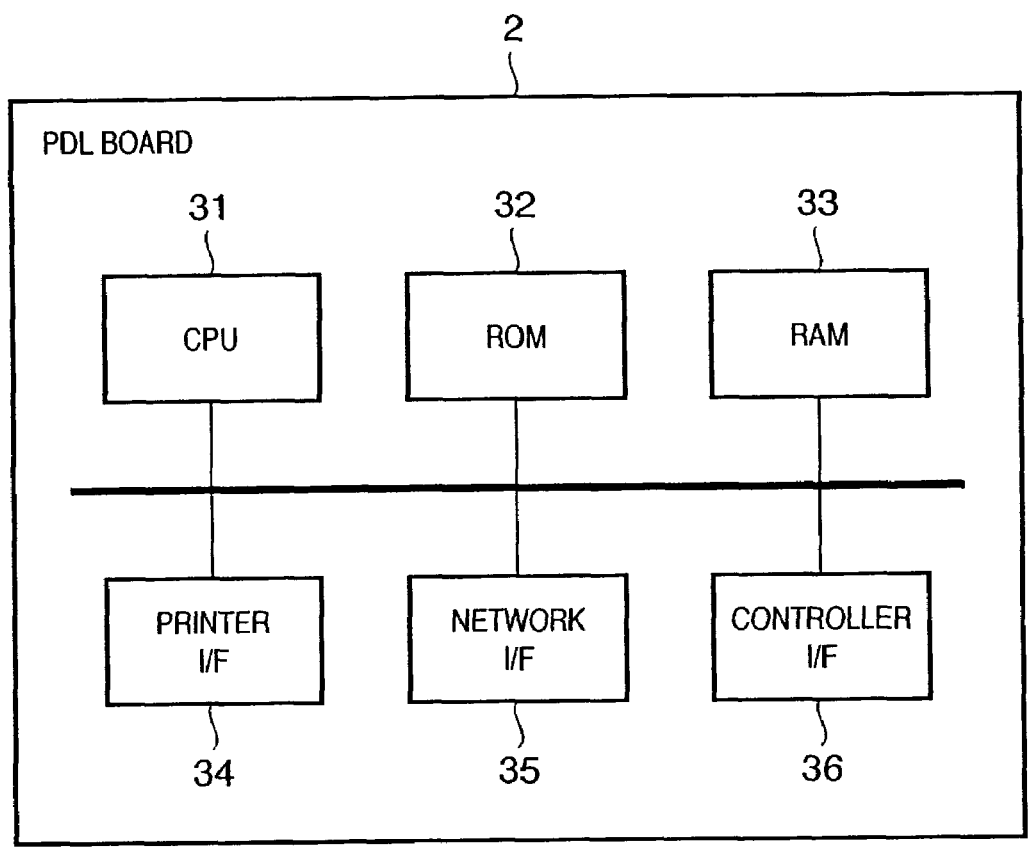
FIG. 3 is a block diagram schematically showing a hardware configuration of a PDL board shown in FIG. 1.

FIG. 3 is a schematic diagram of a hardware configuration of the PDL board 2 shown in FIG. 1.

In FIG. 3, reference numeral 31 denotes a CPU adapted to control the entire PDL board 2; 32, a ROM having stored every program for controlling the PDL board 2; 33, a RAM to be used as a work area when the program is executed, or as a data handling area; 34, a printer I/F adapted to control a physical interface with the printer 6; 35, a network I/F adapted to control a physical interface with the network interface board 1; and 36, a controller I/F adapted to control a physical interface with the controller board 3.

Figure 4:
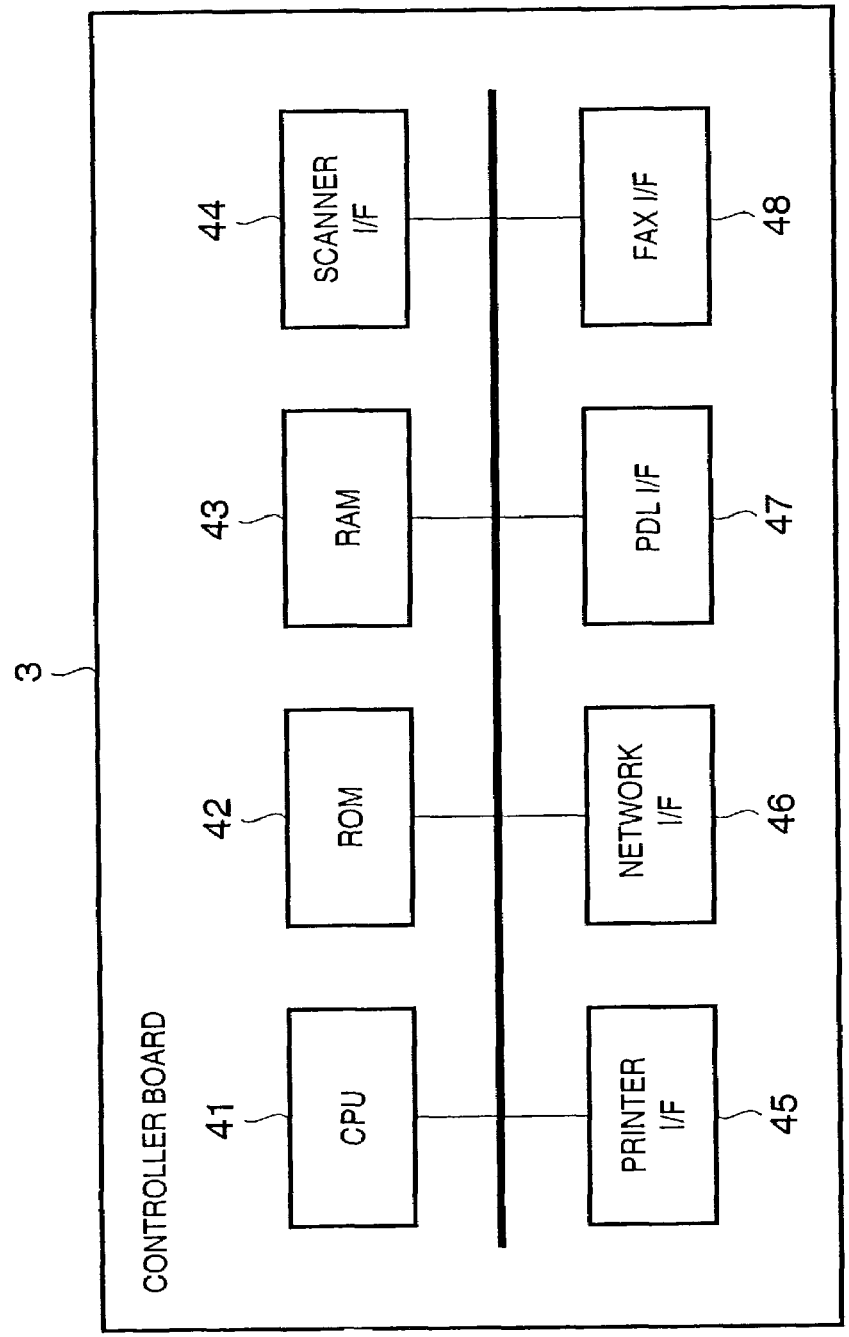
FIG. 4 is a block diagram schematically showing a hardware configuration of a controller board shown in FIG. 1.

FIG. 4 is a schematic diagram of a hardware configuration of the controller board 3 shown in FIG. 1.

In FIG. 4, reference numeral 41 denotes a CPU adapted to control the entire controller board 3; 42, a ROM having stored every program for controlling the controller board 3; 43, a RAM to be used as a work area when the program is executed, or as a data handling area; 44, a scanner I/F adapted to control a physical interface with the scanner 4; 45, a printer I/F adapted to control a physical interface with the printer 6; 46, a network I/F adapted to control a physical interface with the network interface board 1; 47, a PDL I/F adapted to control a physical interface with the PDL board 2; and 48, a FAX I/F adapted to control a physical interface with the FAX board 5.

Figure 5:
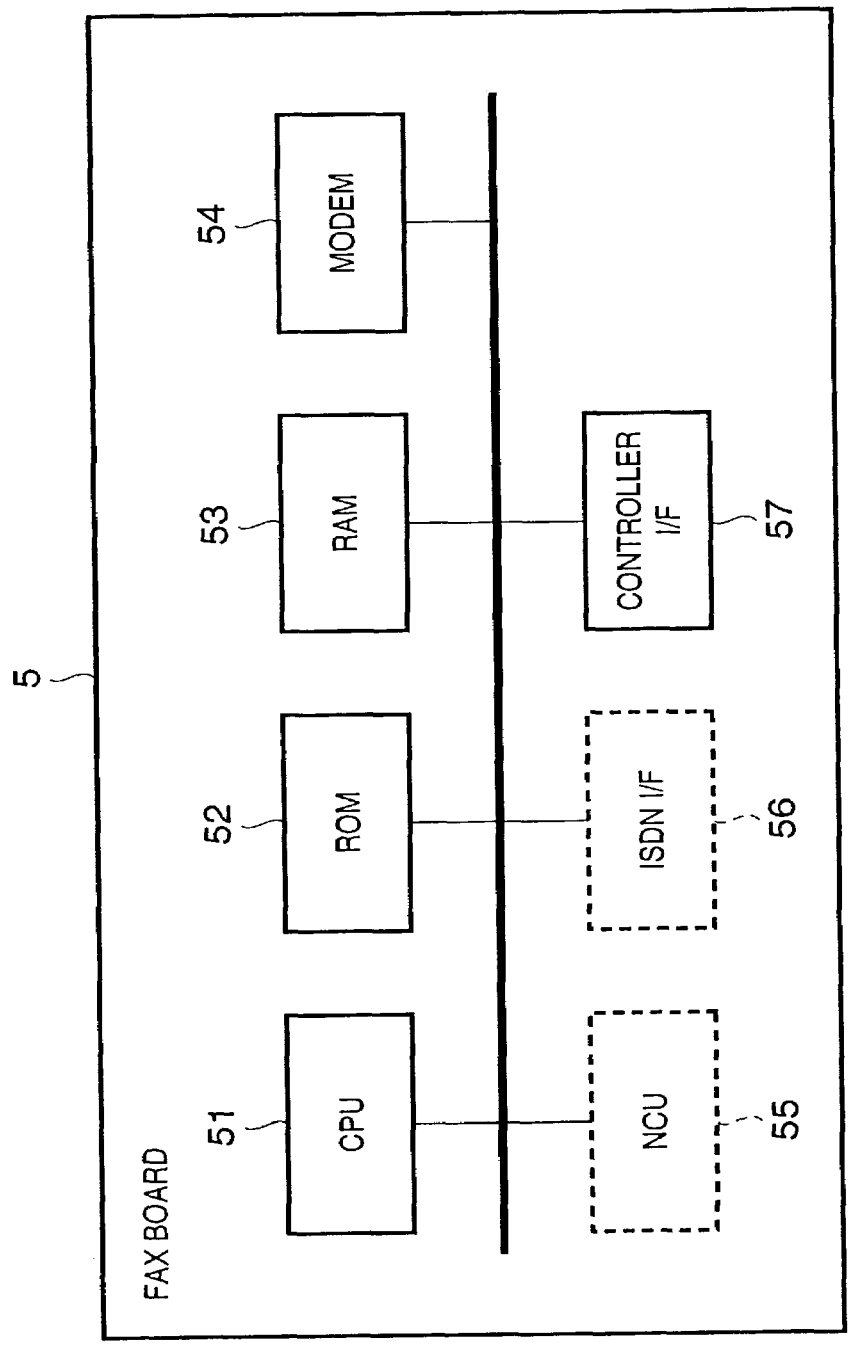
FIG. 5 is a block diagram schematically showing a hardware configuration of a FAX board shown in FIG. 1.

FIG. 5 is a schematic diagram of a hardware configuration of the FAX board 5 shown in FIG. 1.

In FIG. 5, reference numeral 51 denotes a CPU adapted to control the entire FAX board 5; 52, a ROM having stored every program for controlling the FAX board 5; 53, a RAM to be used as a work area when the program is executed, or as a data handling area; 54, a modem adapted to perform digital-analog signal conversion in the facsimile communication; 55, a network control unit (NCU) adapted to control a physical interface with a public switched telephone network (hereinafter referred to as PSTN); 56, an ISDN I/F adapted to control a physical interface with an integrated services digital network (hereinafter referred to as ISDN); and 57, a controller I/F adapted to control a physical interface with the controller board 3.

It should be noted that at least one of the NCU 55 and the ISDN I/F 56 is necessary, and the FAX board 5 may be configured with a plurality of the NCUs 55, a plurality of the ISDN I/Fs 56, or a plurality of both of the NCUs 55 and the ISDN I/Fs 56.

Figure 6:
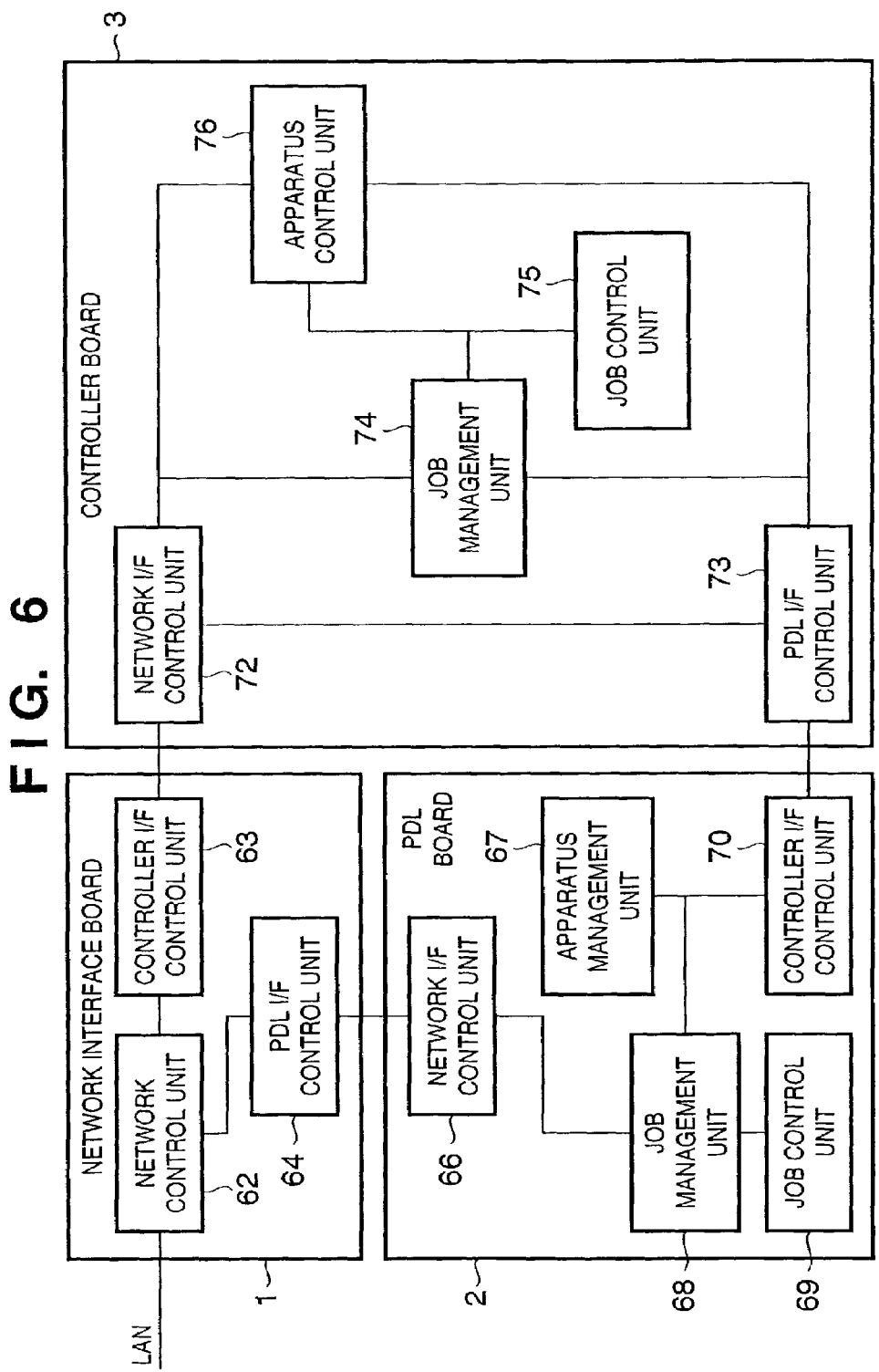
FIG. 6 is a software function block diagram of the network interface board, the PDL board and the controller board shown in FIG. 1.

FIG. 6 is a software function block diagram of the network interface board 1, the PDL board 2 and the controller board 3 shown in FIG. 1.

In the network interface board 1, reference numeral 62 denotes a network control unit adapted to control sending and receiving of the packet with the LAN; 63, a controller interface control unit adapted to control the interface with the controller board 3; and 64, a PDL interface control unit adapted to control the interface with the PDL board 2.

In the PDL board 2, reference numeral 66 denotes a network interface control unit adapted to control the interface with the network interface board 1; 67, an apparatus management unit adapted to manage the entire PDL board 2; 68, a job management unit adapted to manage starting and stopping or the like of the print; 69, a job control unit adapted to handle the printer 6 to control the print; and 70, a controller interface control unit adapted to control the interface with the controller board 3.

In addition, in the controller board 3, reference numeral 72 denotes a network interface control unit adapted to control the interface with the network interface board 1; 73, a PDL interface control unit adapted to control the interface with the PDL board 2; 74, a job management unit adapted to manage starting and stopping or the like of the facsimile or the copy; 75, a job control unit adapted to handle the printer 6 to control the copy, or to control the FAX board 5 to control a facsimile procedure or the like; and 76, an apparatus control unit adapted to manage the entire device.

Figure 7:
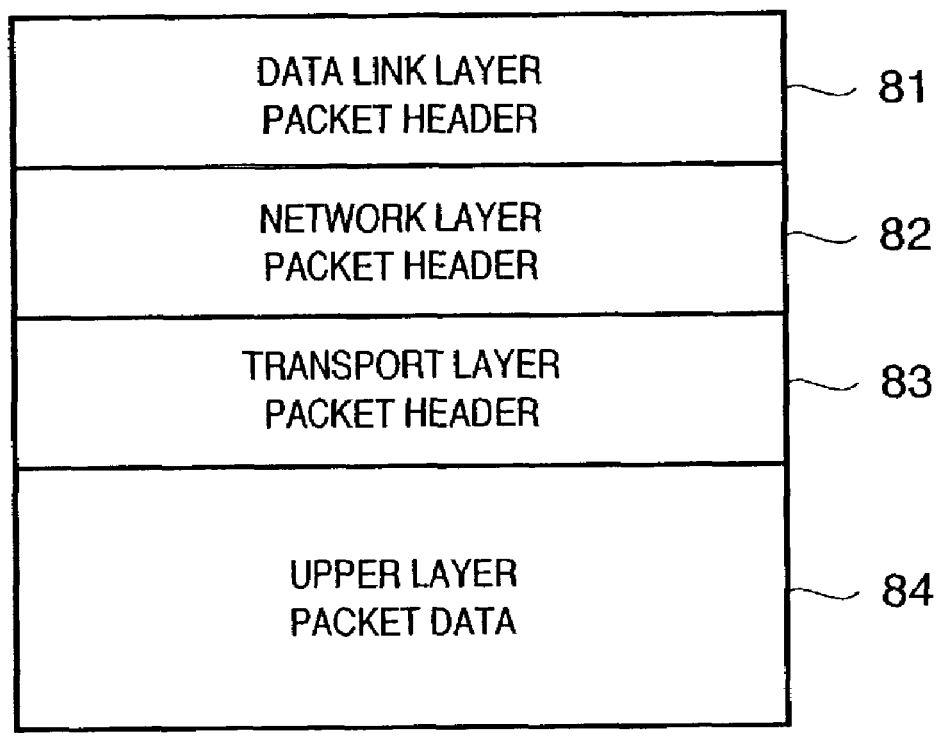
FIG. 7 is a schematic diagram showing a data structure of a packet flowing on a network according to the first embodiment of the present invention.

FIG. 7 is a schematic diagram showing a data structure of the packet flowing on the network according to the present invention. Each data is configured with a data link layer packet header 81, a network layer packet header 82, a transport layer packet header 83 and an upper layer packet data 84.

Figure 8:
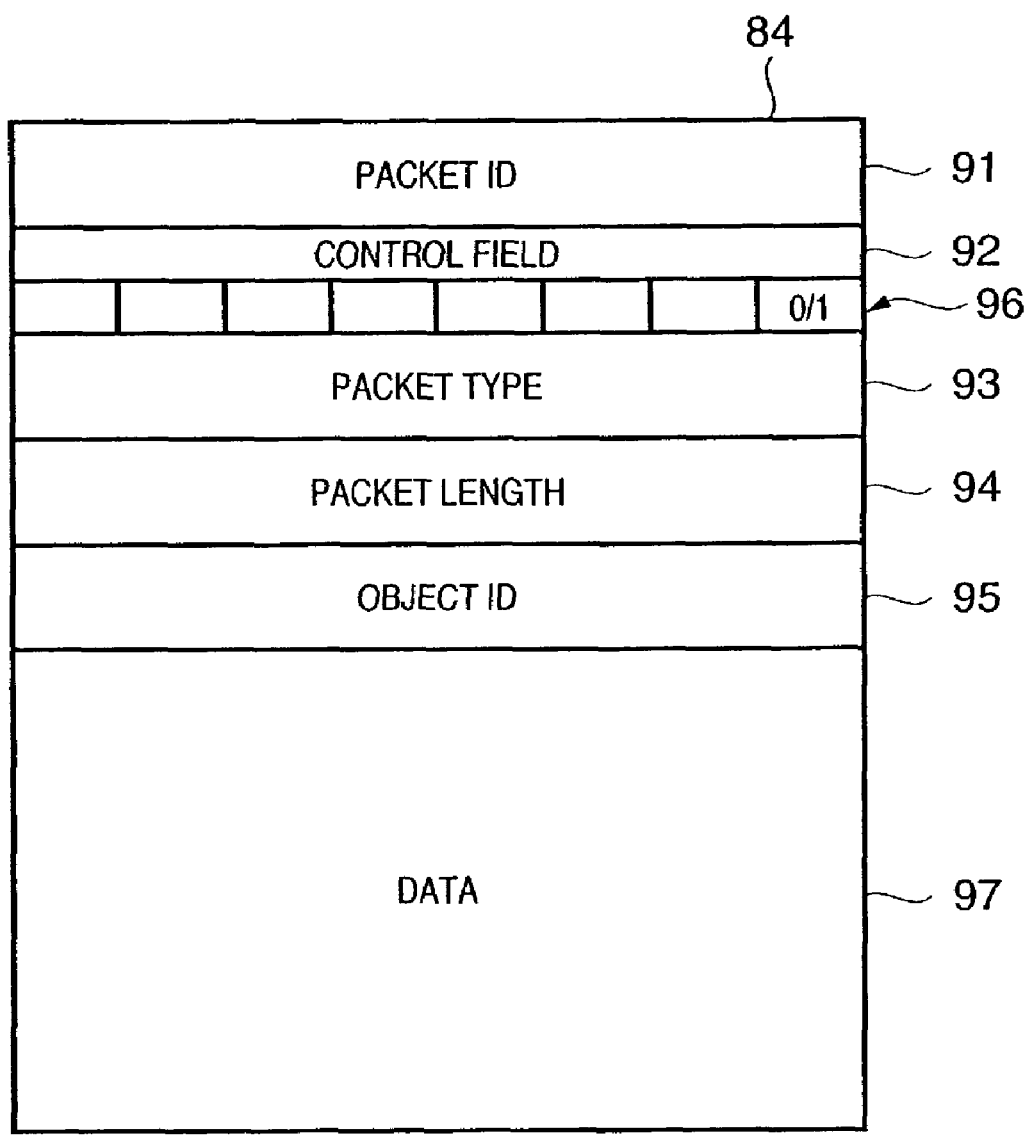
FIG. 8 shows a detail of an upper layer packet data shown in FIG. 7.

FIG. 8 shows a detail of the upper layer packet data 84 shown in FIG. 7.

Reference numeral 91 denotes a packet ID for indicating that it is a packet for controlling according to the present invention; 92, a control field to be used to indicate the function by bit; 93, an area for indicating a packet type such as an apparatus management command, image data or the like; 94, an area for indicating a packet length that is to indicate a data length of the upper layer data 84; 95, an area for indicating an object ID that is to indicate an ID for identifying which function block shown in FIG. 6 the packet is for; 96, a bit for, if the packet type is the image data, indicating whether the data is for the PDL board 2 or not; and 97, the data as the body.

Next, a procedure in the composite apparatus having the above configuration will be described below.

Figure 9:
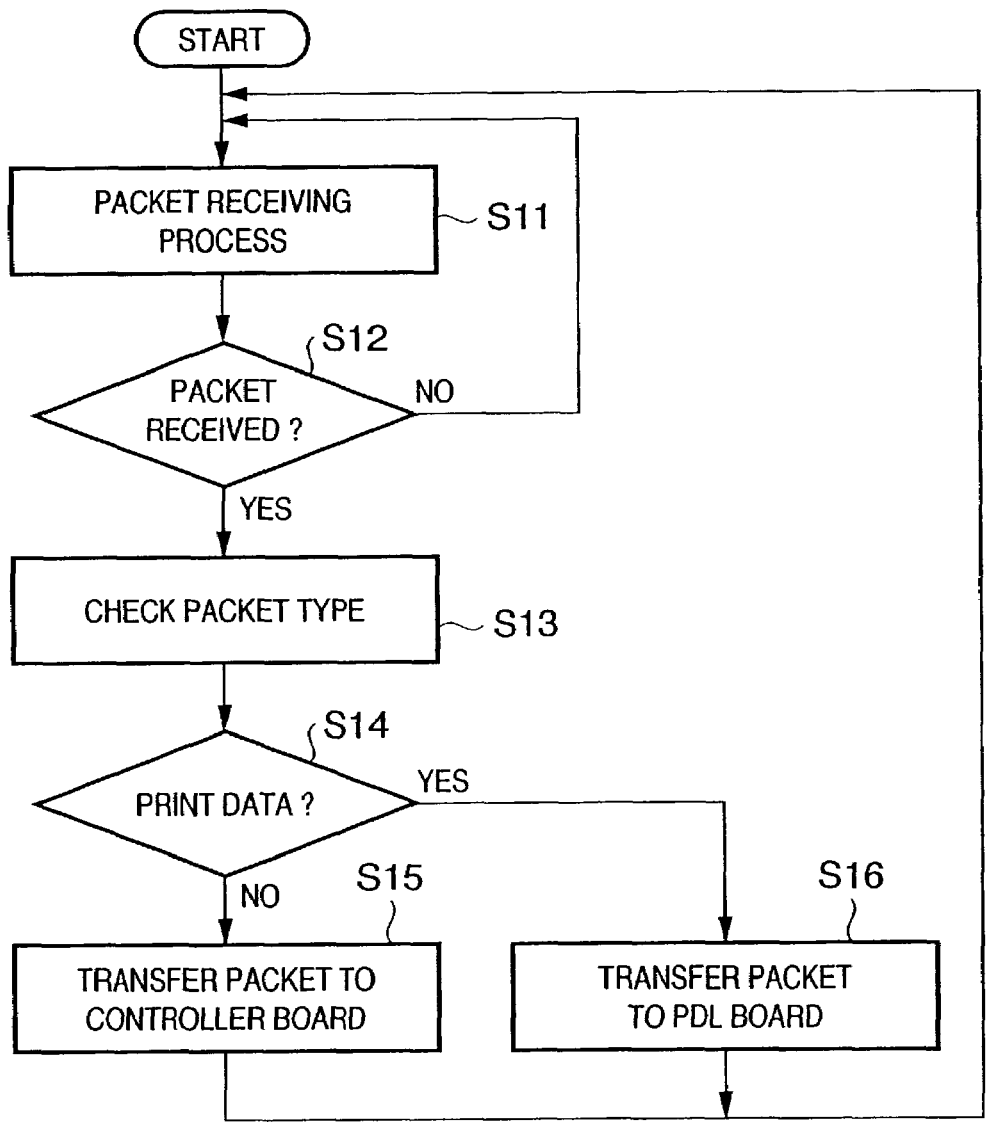
FIG. 9 is a flowchart showing a packet receiving process in the network interface board according to the first embodiment of the present invention.

FIG. 9 is a flowchart showing a packet receiving process in the network interface board 1 according to the first embodiment. The process when receiving the packet in the network interface board 1 will be described below with reference to FIG. 1, FIG. 2, FIG. 6 and FIG. 8.

In steps S11 and S12, the CPU 21 determines, from the process in the network control unit 62, whether the packet is received from the LAN by controlling the LAN I/F 24. As a result of the determination in step S12, if the packet is not received, the packet receiving process in step S11 is performed continually.

On the other hand, as a result of the determination in step S12, if the packet is received, in step S13, the packet type 93 of the received packet and the bit 96 in the control field 92 are checked. As a result of the determination in step S14, if the packet type is not the image data, or if the packet type 93 indicates the image data, but the bit 96 of the control field 92 does not indicate the print data, in step S15, the received packet is transferred to the controller board 3 by controlling the controller I/F 26.

As a result of the determination in step S14, if the packet type 93 indicates the image data and the bit 96 of the control field 92 indicates the print data, in step S16, the received packet is transferred to the PDL board 2 by controlling the PDL I/F 25.

Figure 10:
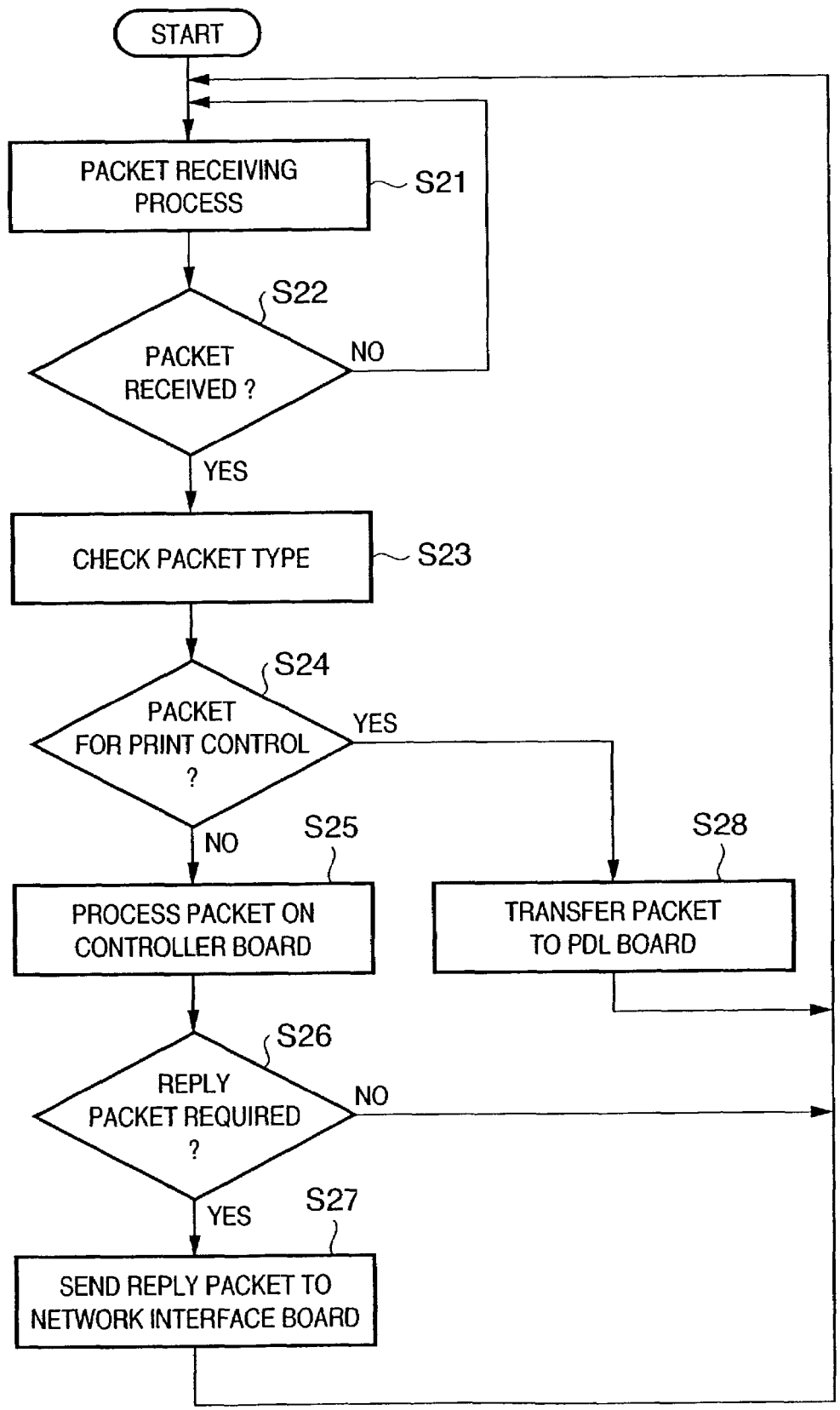
FIG. 10 is a flowchart showing the process for the packet received in the controller board from the network interface board according to the first embodiment of the present invention.

FIG. 10 is a flowchart showing the process in the controller board 3 for the packet received from the network interface board 1 according to the first embodiment of the present invention. The process when receiving the packet in the controller board 3 will be described below with reference to FIG. 1, FIG. 4, FIG. 6 and FIG. 8.

In steps S21 and S22, the CPU 41 determines, in the process in the network interface control unit 72, whether the packet is received from the network interface board 1 by controlling the network I/F 46. As a result of the determination in step S22, if the packet is not received, the packet receiving process in step S21 is performed continually.

On the other hand, as a result of the determination in step S22, if the packet is received, in step S23, the packet type 93 of the received packet and the object ID 95 are checked. As a result of the determination in step S24, if the object ID 95 does not indicate the ID of a print control packet, in step S25, the received packet is processed in the apparatus control unit 76 or the job management unit 74 on the controller board 3.

It should be noted that the print control packet represents a packet indicating an inquiry on information, a condition or the like controlled by the PDL board 2, or indicating setting of the information. For example, the information includes a name of the apparatus, where the apparatus is installed, information on a device administrator, an operation history of the facsimile communication or the printing or the like. The condition includes the condition of the apparatus such as whether the device is performing the facsimile communication or the printing, or in a no-paper condition or the like.

If the object ID 95 indicates the inquiry on the information, the condition or the like managed by the controller board 3, or the setting of the information, in step S25, the process is performed such as setting or collecting the information and the condition indicated by the packet received in the apparatus control unit 76. In addition, if the object ID 95 indicates that the packet is the image data executable in the controller board 3, in step S25, storage and execution of a job indicated by the received packet are performed in the job management unit 74. For example, if the indicated image data is a facsimile data, the job management unit 74 generates a facsimile job, and the job control unit 75 performs the facsimile communication.

When the received packet is processed in step S25, if it is necessary to send a reply packet (YES in step S26), in step S27, the reply packet is sent to the network interface board 1 by controlling the network I/F 46.

On the other hand, as a result of the determination in step S24, if the object ID 95 indicates the ID of the print control packet, the CPU 41, in the process in the PDL interface control unit 73, transfers the packet received in step S22 to the PDL board 2 by controlling the PDL I/F 47 (step S28).

In step S28, when the packet is transferred from the controller board 3 to the PDL board 2, the PDL board 2 performs the process of setting and collecting the information and the condition indicated by this packet in the apparatus management unit 67. Similarly to steps S26 and S27 in the controller board 3, also in the PDL board 2, if it is necessary to send the reply packet when the received packet is processed, the reply packet is sent to the controller board 3 by controlling the controller I/F 36. For example, if the information or the condition is inquired, the reply packet is set with the information or the condition inquired, and if the information is set, a result of setting the information or the like is set.

Figure 11:
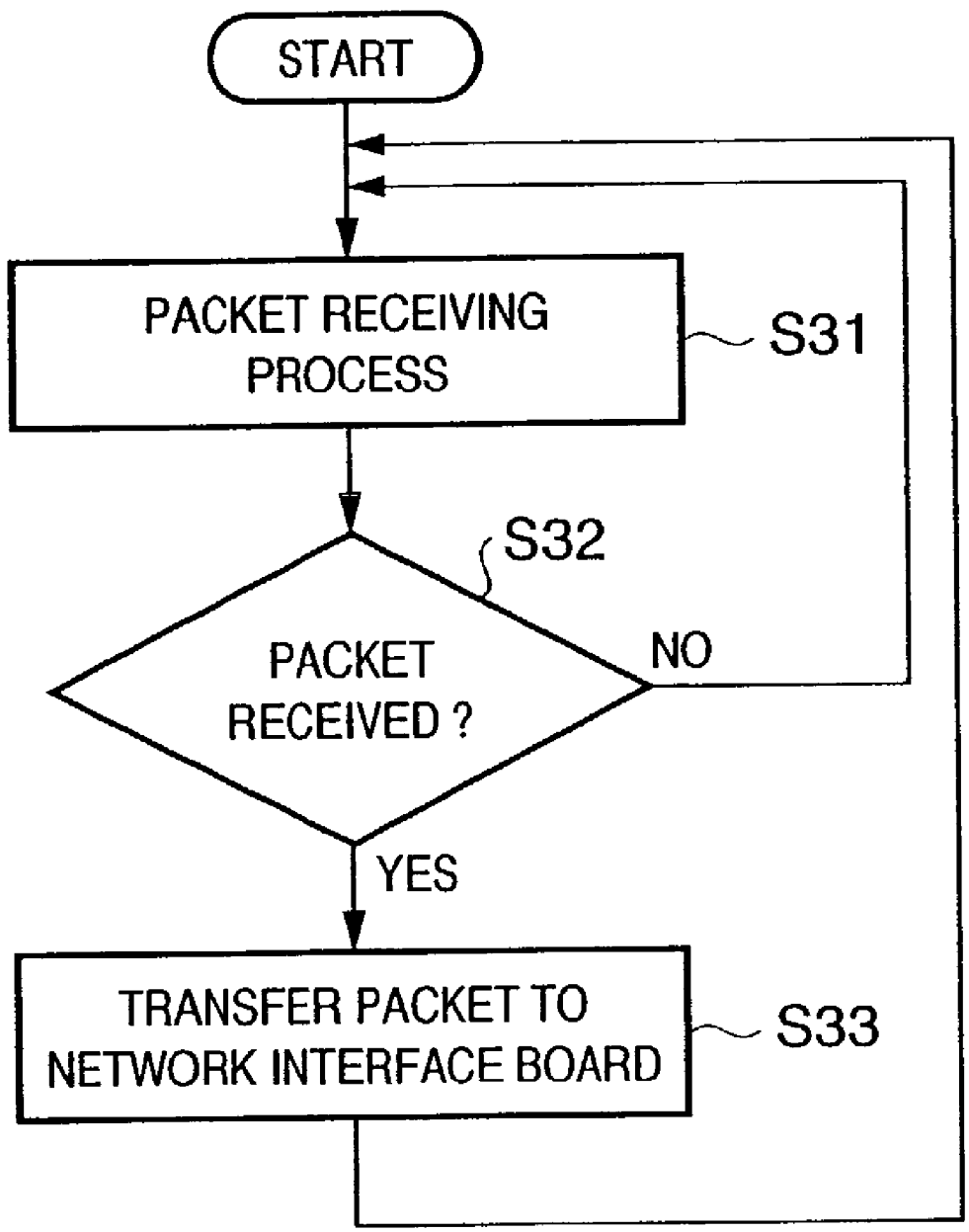
FIG. 11 is a flowchart showing the process for the packet received in the controller board from the PDL board according to the first embodiment of the present invention.

FIG. 11 is a flowchart showing the process in the controller board 3 for the packet received from the PDL board 2 according to the first embodiment of the present invention. The process in the controller board 3 when receiving the packet from the PDL board 2 will be described below with reference to FIG. 1 and FIG. 4.

The packet received from the PDL board 2 is the above described reply packet of the PDL board 2 or the like. In steps S31 and S32, the CPU 41 determines whether the packet is received from the PDL board 2, by controlling the PDL I/F 47. As a result of the determination in step S32, if the packet is not received, the packet receiving process in step S31 is performed continually.

On the other hand, as a result of the determination in step S32, if the packet is received, the received packet is transferred to the network interface board 1 by controlling the network I/F 46.

Next, an example of a detailed data flow in the present composite apparatus will be described below, with reference to FIG. 6 and FIG. 9 to FIG. 11.

If there is an inquiry on a condition of the facsimile communication of the composite apparatus of the first embodiment from another terminal on the LAN, the network control unit 62 receives an inquiry packet (steps S11 and S12), and the controller I/F control unit 63 transfers the inquiry packet to the controller board 3 (step S15).

The network I/F control unit 72 receives the inquiry packet transferred from the network interface board 1 (steps S21 and S22), the job management unit 74 checks the condition of the facsimile communication (step S25), the condition of the facsimile communication is set to the reply packet (step S26), and the network I/F control unit 72 transfers the reply packet to the network interface board 1 (step S27).

The controller I/F control unit 63 receives the reply packet transferred from the controller board 3, and the network control unit 62 sends the reply packet over the LAN.

The above described operation allows the other terminal on the LAN to acquire the condition of the facsimile communication of the composite apparatus.

Next, if there is an inquiry on a condition of the printing of the composite apparatus of the first embodiment from another terminal on the LAN, the network control unit 62 receives the inquiry packet (steps S11 and S12), and the controller I/F control unit 63 transfers the inquiry packet to the controller board 3 (step S15).

The network I/F control unit 72 receives the inquiry packet transferred from the network interface board 1 (steps S21 and S22), and the PDL I/F control unit 73 transfers the inquiry packet to the PDL board 2 (step S28).

The controller I/F control unit 70 receives the inquiry packet transferred from the controller board 3, the job management unit 68 checks the condition of the printing and sets the condition of the printing to the reply packet, and the controller I/F control unit 70 transfers the reply packet to the controller board 3.

The PDL I/F control unit 73 receives the reply packet from the PDL board 2 (steps S31 and S32), and the network I/F control unit 72 transfers the reply packet to the network interface board 1 (step S33).

The controller I/F control unit 63 receives the replay packet transferred from the controller board 3, and the network control unit 62 sends the reply packet over the LAN.

The above described operation allows the other terminal on the LAN to acquire the condition of the printing of the composite apparatus.

Further, if there is an inquiry on a condition of the recording paper in the composite apparatus of the first embodiment from another terminal on the LAN, the network control unit 62 receives the inquiry packet (steps S11 and S12), and the controller I/F control unit 63 transfers the inquiry packet to the controller board 3 (step S15).

The network I/F control unit 72 receives the inquiry packet transferred from the network interface board 1 (steps S21 and S22), the apparatus control unit 76 checks the condition of the recording paper and sets the condition of the recording paper to the reply packet (step S25), and the network I/F control unit 72 transfers the reply packet to the network interface board 1 (step S27).

The controller I/F control unit 63 receives the reply packet transferred from the controller board 3, and the network control unit 62 sends the reply packet to the LAN.

The above described operation allows the other terminal on the LAN to acquire the condition of the recording paper of the composite apparatus.

As described above, according to the first embodiment, it is possible to realize the network-type composite apparatus integrally configured with an existing copying function, an existing facsimile function and an existing printer function, with a low development cost.

In addition, mass data packets such as the print data or the like are distributed to the PDL board by the network interface board, the information for the printing and management of the printing is managed and controlled on the PDL board, and other processes are performed on the controller board, thereby load of a system is distributed and a print speed is increased.

It should be noted that, though it is possible to configure each board denoted in FIG. 1 to FIG. 5 separately as described above to lower the cost and increase the print speed. If they are configured integrally, it is still possible to increase the print speed.

Second Embodiment

Figure 12:
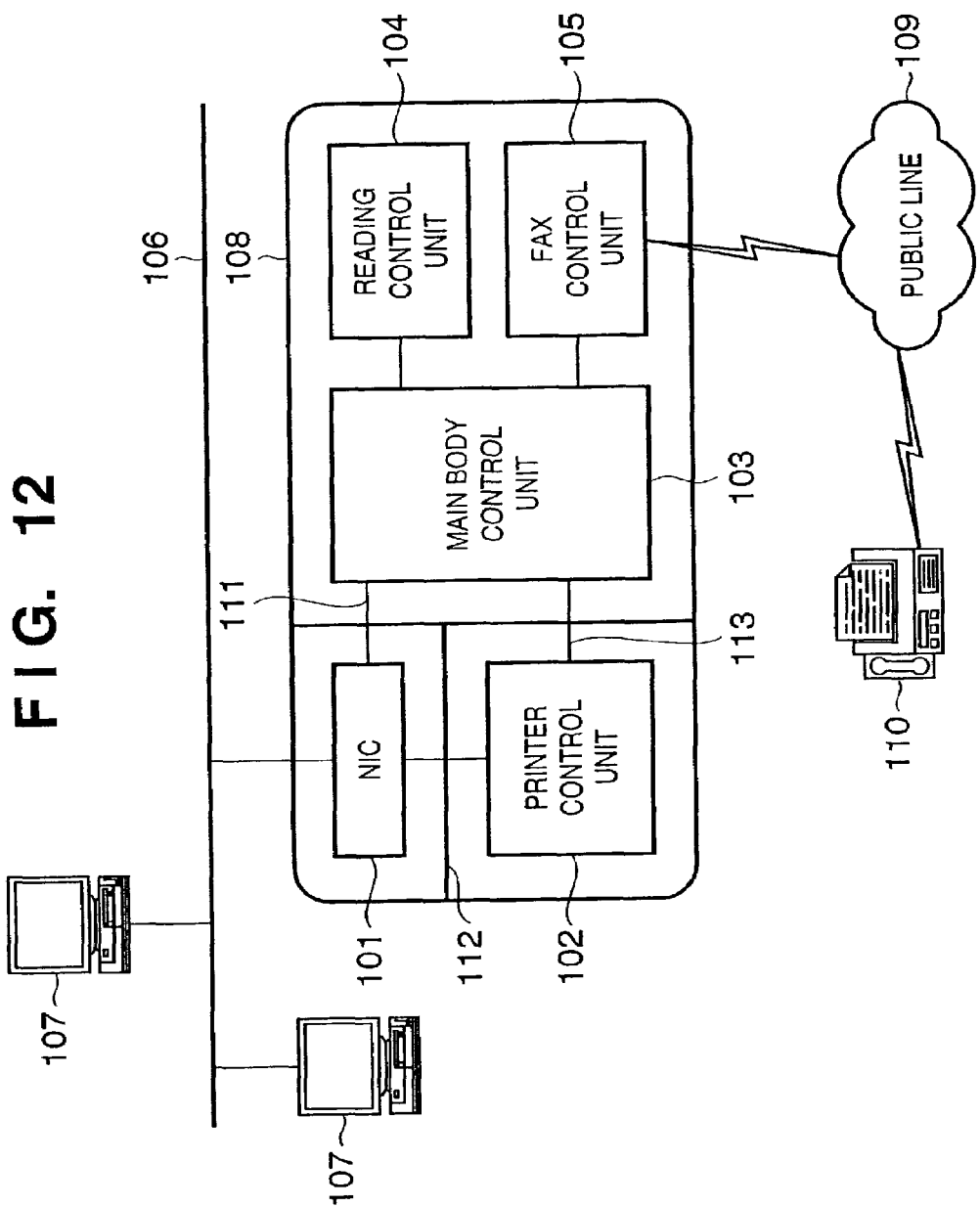
FIG. 12 shows a system configuration including a facsimile apparatus according to a second embodiment of the present invention.

FIG. 12 shows a system configuration including a facsimile apparatus according to a second embodiment of the present invention. In FIG. 12, reference numeral 106 denotes a network; 107, a terminal device such as the PC; 108, the facsimile apparatus of the present invention; 109, a public line; and 110, another facsimile apparatus.

The facsimile apparatus 108 is basically configured with a network interface card (NIC) 101, a printer control unit 102, a main body control unit 103, a reading control unit 104 and a FAX control unit 105. The NIC 101 connects to the main body control unit 103 via a USB I/F 111, and to the printer control unit 102 via a printer I/F 112. In addition, the printer control unit 102 connects to the main body control unit 103 via an I/F 113, and the NIC 101 and the printer control unit 102 are detachable. By configuring the NIC 101 and the printer control unit 102 to be detachable as described above, it is possible to mount these functions as necessary, or to exchange the NIC 101.

The network 106 may be connected with a plurality of the terminal devices 107 for remote control. From browser software operating on the terminal devices 107, it is possible to designate a network address of the facsimile apparatus 108 as an HTTP server to access it, thereby enabling a remote operation.

In addition, the FAX control unit 105 connects to the public line 109, thereby the FAX control unit 105 may send and receive data with another facsimile apparatus 110 or the like by means of a conventional facsimile communication procedure.

Figure 13A:
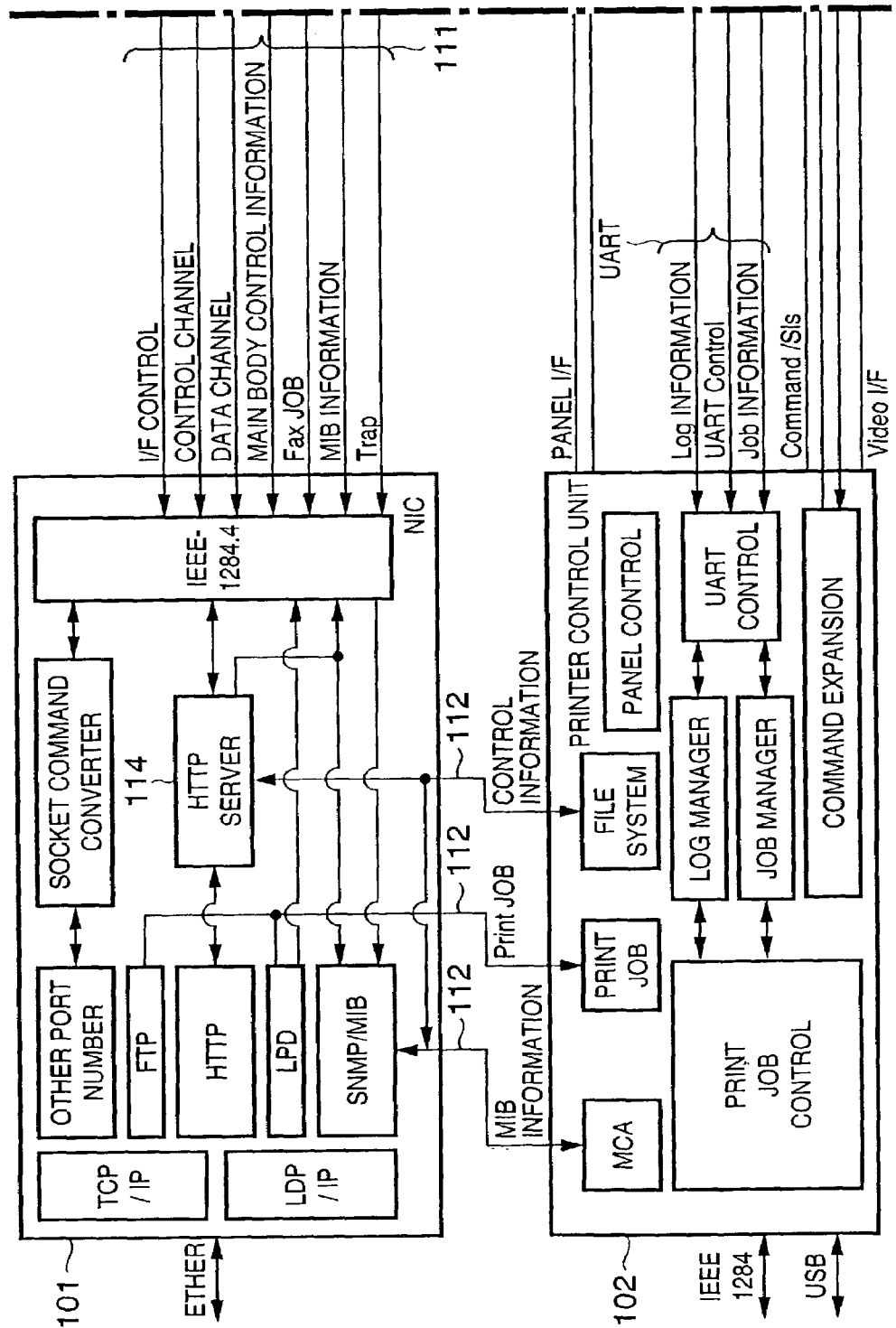

FIGS. 13A and 13B are block diagrams showing in detail an example of an internal configuration of the facsimile apparatus 108 of the present invention.

The NIC 101 connects to the main body control unit 103 by the USB I/F 111 as described above. On the USB I/F 111, a plurality of channels are theoretically implemented according to the IEEE 1284.4 standard, thereby a composite information exchange is enabled between the NIC 101 and the main body control unit 103.

In the NIC 101, there are function blocks depending on each of network protocols and port numbers, and an HTTP server 114 is placed as the block for processing an HTTP protocol. The HTTP server 114 may utilize the channel for main body control information provided on the USB I/F 111 or the channels to be used for other protocols such as SNMP/MIB or the like to collect the information from the main body and generate contents.

Figure 14:
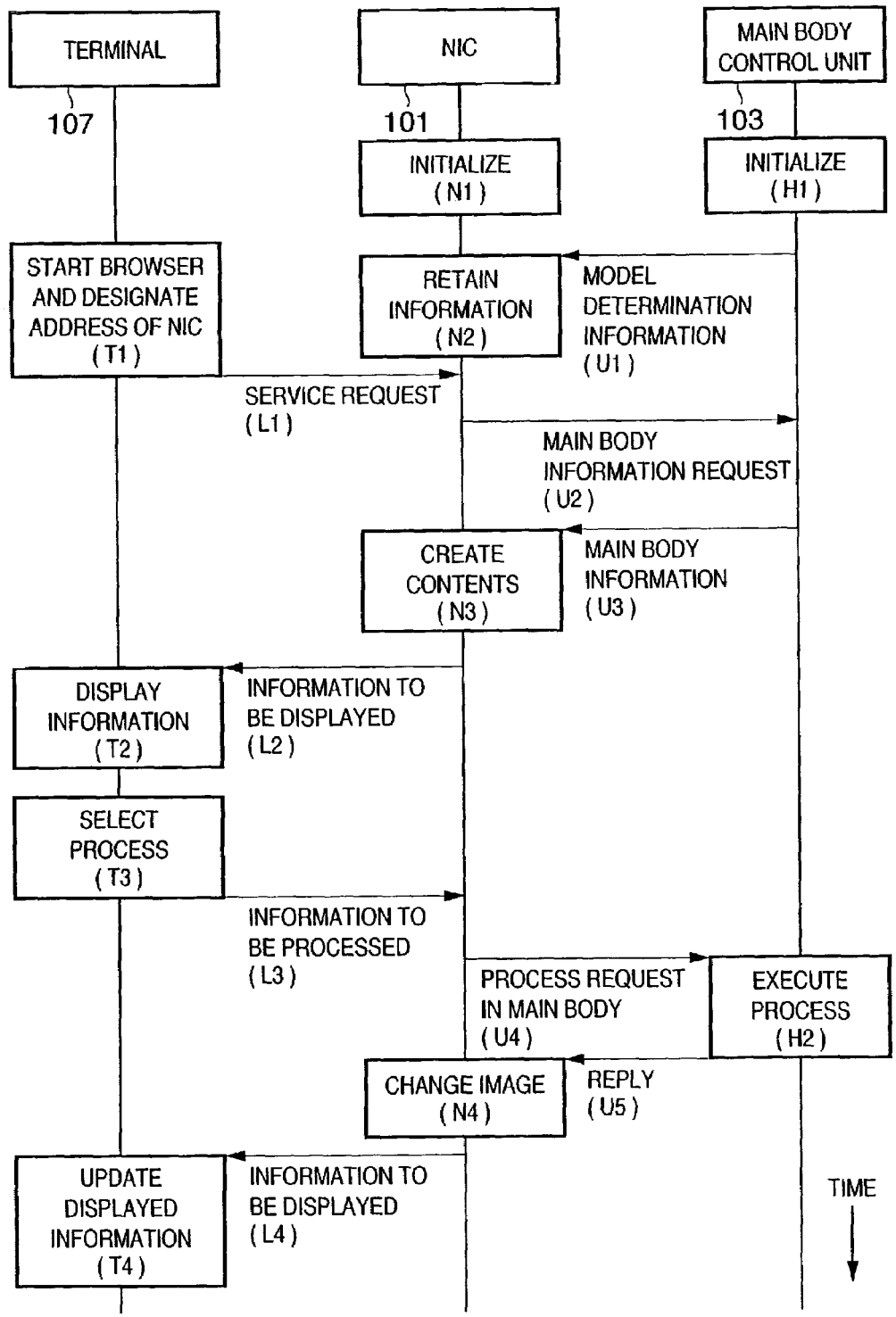
FIG. 14 shows operations of a terminal device, an NIC and a main body control unit, and an information flow among them, in time series, according to the second embodiment of the present invention.

FIG. 14 represents operations of the terminal device 107, the NIC 101 and the main body control unit 103, and an information flow among them, in time series, in the case where the terminal device 107 remotely operates, via the network, viewing of sending and receiving history information of the facsimile apparatus 108 or registration of apparatus information or the like.

When a power of the main body of the facsimile apparatus 108 is turned on, the NIC 101 and the main body control unit 103 perform initialization conjunctionally (N1/H1). Then, the main body control unit 103 passes information necessary for determining a model of the apparatus to the NIC 101 (U1). The NIC 101 retains the information and prepares for creating the contents depending on the model (N2).

When a user of the terminal device launches the browser and designates an address which the NIC 101 has (T1), a service request is reached to the NIC 101 via the LAN (L1). The NIC 101 requests the main body control unit 103 for information necessary to generate the contents, such as an external view of a product, sending and receiving result information of the facsimile or the like (U2). The main body control unit 103 passes the designated information (U3), and the NIC 101 generates the contents based on the information (N3). More specifically, the NIC 101 produces an html or shtml file embedded with an invocation of a CGI (Common Gateway Interface), or an SSI (Server Side Include).

Then, the NIC 101 returns file information to be displayed on the browser on the terminal device 107 (L2), and the information is displayed on the terminal device 107 (T2). Thereby the user may browse the information of the facsimile apparatus 108 on the browser.

If the user performs the remote operation such as rewriting the information of the facsimile apparatus 108, halt of the process being executed or the like, the user selects the process on the browser depending on a substance of the contents (T3). When the information is reached to the NIC 101 via the LAN (L3), the NIC 101 executes the predetermined process using the CGI or the SSI, and issues an operation request to the main body control unit 103 (U4). When the required process is succeeded in the main body control unit 103 (H2), the reply is returned (U5), the NIC 101 switches a content to be displayed depending on the reply (N4) and returns the information to be displayed (L4). The terminal device 107 updates the display screen based on the received information to be displayed (T4).

Afterward, by repeating the operation similarly, the display of the main body information and the remote operation of the apparatus may be repeated.

As described above, according to the second embodiment, the remote operation of the facsimile apparatus is enabled by implementing the HTTP server within the NIC to be mounted on the facsimile apparatus, without installing an independent HTTP server machine. In addition, by configuring the NIC to be detachable, the function required for the remote operation is provided only when the network function is used, and moreover, it is possible to provide a low-cost facsimile apparatus wherein only exchanging of the NIC is needed to improve performance of an HTTP server function.

Furthermore, a single NIC may be used generally among different models by utilizing the I/F with the main body to exchange the information inherent to the facsimile apparatus and changing the contents to be served by the HTTP.

It should be noted that, though in the above described second embodiment, the case where the facsimile apparatus is used as the printer connected to the LAN is described, the present invention is not limited to the facsimile apparatus, but also applicable to a composite apparatus which may execute, for example, the facsimile function, the copying function, the printer function and a scanner function. In such case, such composite apparatus may be realized by using a similar configuration as shown in FIG. 12 and FIGS. 13A and 13B, with a known control method. More specifically, the facsimile function may be realized by outputting the image data read by the reading control unit 104, from the fax control unit 105, or by printing the image data inputted by the FAX control unit 105, at the main body control unit 103. The copying function may be realized by printing the image data read by the reading control unit 104, at the main body control unit 103. The printer function may be realized by printing the image data inputted via the NIC 101 and/or the printer control unit 102, at the main body control unit 103. The scanner function may be realized by outputting the image data read by the reading control unit 104, from the NIC 101 to the terminal device 107.

As described above, according to the present invention, it is possible to lower a development period and the development cost for the composite apparatus having the printer function, the copying function, the facsimile function or the like, and it is also possible to distribute the load of the system and increase the print speed.

In addition, the present invention enables the remote operation of the composite apparatus with the facsimile apparatus and the copying device and/or the printer, and the facsimile apparatus, without installing the independent HTTP server machine. In addition, according to the present invention, it is able to provide inexpensively the composite apparatus and the facsimile apparatus to which the functions required for the remote operation can be provided as necessary, and which have an HTTP server function whose performance can be improved.

Furthermore, a single NIC may be used generally among composite apparatuses and facsimile apparatuses of different models.

The present invention is not limited to the above embodiments and various changes and modifications can be made within the spirit and scope of the present invention. Therefore to apprise the public of the scope of the present invention, the following claims are made.

What is claimed is:

1. A control method for a composite apparatus having a printer unit, a scanner unit, a facsimile communication unit, a controller adapted to control copying operation and facsimile operation by the scanner unit and the facsimile communication unit, a network connector adapted to connect to a computer network to send and receive a packet, a printer language processor adapted to process a printer language, and a direct signal line directly connecting the network connector with the printer language processor, said method comprising:

determining whether the packet received by the network connector is print data or not by analyzing a header of the packet without processing the packet;

transferring the packet from the network connector to the printer language processor via the direct signal line without transferring the packet to the controller if the packet is print data;

processing in the printer language processor the transferred packet into print data suitable for printing;

printing the print data processed by the printer language processor in the printer unit under control of the printer language processor; and transferring the packet from the network connector to the controller without transferring the packet to the printer language processor if the packet is not print data.

2. The control method according to claim 1, further comprising:

determining in the controller whether the transferred packet is image data for facsimile communication or not;

processing in the controller the packet into image data suitable for facsimile communication if the packet is image data for facsimile communication; and transferring the image data via the facsimile communication unit.

3. The control method according to claim 1, wherein the printer language processor is detachable.

4. A composite apparatus comprising:

a printer unit;

a scanner unit;

a facsimile communication unit;

a controller adapted to control copying operation and facsimile operation by said scanner unit and said facsimile communication unit;

a printer language processor adapted to process a printer language and a direct signal line directly connecting the network connector with the printer language processor; and a network connector adapted to connect to a computer network to send and receive a packet, wherein said network connector determines whether the received packet is print data or not by analyzing a header of the packet without processing the packet, and transfers said packet to the printer language processor via the direct signal line without transferring said packet to said controller if the packet is print data, and said printer language processor processes the packet into print data suitable for printing and controls said printer unit to print the print data; and wherein said network connector transfers said packet to said controller without transferring said packet to said printer language processor if the packet is not print data.

5. The composite apparatus according to claim 4, wherein said controller determines whether the packet transferred from said network connector is image data for facsimile communication or not, and if the packet is image data for facsimile communication, said controller processes the packet into image data suitable for facsimile communication, and transfers the image data via said facsimile communication unit.

6. The composite apparatus according to claim 4, wherein said printer language processor is detachable.

7. The composite apparatus according to claim 4, wherein said network connector is detachable.

* * * * *